United States Patent [19]

Hiramine

[11] Patent Number: 5,047,606

[45] Date of Patent: Sep. 10, 1991

[54] METHOD AND DEVICE FOR CALCULATING AN OFFSET DIRECTION AND A TILT DIRECTION OF THE WIRE ELECTRODE OF A WIRE ELECTRO-DISCHARGE MACHINING APPARATUS

[75] Inventor: Jiro Hiramine, Kawasaki, Japan

[73] Assignee: Amada Wasino Co., Ltd., Japan

[21] Appl. No.: 567,156

[22] Filed: Aug. 14, 1990

[30] Foreign Application Priority Data

Aug. 15, 1989 [JP] Japan .................................. 1-209550

[51] Int. Cl.⁵ ............................................. B23H 7/06
[52] U.S. Cl. ................................ 219/69.12; 219/69.17
[58] Field of Search ............... 219/69.17, 69.12, 69.13; 364/474.04

[56] References Cited

U.S. PATENT DOCUMENTS 4,837,415  6/1989  Magara et al. ................... 219/69.12

FOREIGN PATENT DOCUMENTS 59-73229  4/1984  Japan ................................ 219/69.13

Primary Examiner—Geoffrey S. Evans
Attorney, Agent, or Firm—Wigman & Cohen

[57] ABSTRACT

Method and Apparatus for calculating an offset direction of a wire electrode using inputted offset data which contains the information as to whether the wire electrode should be offset on the inner side or outer side of the theoretical position. The offset data and the advancing direction of the wire electrode are used to determine whether the wire should be offset on the left or right side of the theoretical position.

4 Claims, 2 Drawing Sheets

METHOD AND DEVICE FOR CALCULATING AN OFFSET DIRECTION AND A TILT DIRECTION OF THE WIRE ELECTRODE OF A WIRE ELECTRO-DISCHARGE MACHINING APPARATUS

BACKGROUND OF THE INVENTION

1. Field of the Invention

The present invention relates to a method and device for calculating an offset direction and a tilt direction of the wire electrode of a wire electro-discharge machining apparatus.

2. Description of the Prior Art

It is known that in the wire electro-discharge machining apparatus, a position of the wire electrode is offset by the dimension thereof so as to perform a precise machining. That is to say, an actual path of the wire electrode (i.e. the centerline of the wire electrode) is located at a position which is shifted by a half of the thickness of the electrode from a theoretical path thereof which coincides with positions of a perimeter of the product to be produced.

Conventionally, a direction of the offset is instructed in a manner such that the actual path of the wire electrode should be on the right or on the left of the theoretical path thereof. For example, as shown in FIG. 1(A), when a product 9 such as a punch tool or the like is inputted and displayed in a numerically controlled product configuration device, an actual path 10 is located at a position shifted on the outside of a theoretical path 11. In this case, if the wire electrode advances during the course of machining operation along the the path 10 in the counter clockwise direction as shown in FIG. 1(A), it is input such that the wire electrode position is shifted on the right of the path 10. Then, the path of the wire electrode or the perimeter of the product is displayed in a display device, for example, as green to distinguish the offset direction.

As shown in FIG. 1(B), when a product 12 such as a die tool is machined, the actual path 13 is located at a position shifted on the inside of the theoretical path 14. In this case, if the wire electrode advances during the course of machining in the clockwise direction as shown in FIG. 1(B), it is input such that the wire electrode position is shifted on the right of the theoretical path 14. The path of the wire electrode is also displayed as green since the offset direction is the same as that shown in FIG. 1(A).

Similarly, as shown in FIG. 3(C) or FIG. 3(D), when the actual paths 15, 17 are located at positions shifted on the outerside of the theoretical path 16 or 18, and the electrode advances during the course of the machining along the paths 16, 18 in the clockwise direction, it is input that the wire electrode positions are shifted on the left of the theoretical paths 16, 18. In this case, the paths 16, 18 are displayed, for example, as yellow to show that the offset direction is different from those of FIGS. 1(A) and 1(B).

In order to machine a taper section in a workpiece, the wire electrode is inclined on the right or the left with respect to the advancing direction thereof. In this case, the direction of the inclination of the wire electrode is input and displayed in the same way as for the above-mentioned wire position offset direction.

However, with this conventional method of input and display of the wire electrode offset direction, when the configuration of the product to be produced is first programmed, and the instruction of the offset direction is input (e.g. this is the case where the configuration is drawn up by a computer aided design system and the like), there is the problem that in order to find the advancing direction of the wire electrode, data sheet and the like, which are used for preparing, the configuration of product, must be checked one by one.

In addition, even in the case where the direction of advancement of the wire electrode is learned from the data sheets and the like, and the instructions for wire offset direction are input as shown in FIGS. 1(A) to (D), there is the further problem that it is difficult to determine intuitively whether the wire electrode offset direction is the direction in which the configuration is contracting or the direction in which the configuration is expanding.

The same type of problem occurs with the direction of the inclination of the wire electrode, which is inclined for machining a taper section in a workpiece, as with the wire electrode offset direction. In particular, whether the configuration is upward-expanding or downward-expending is difficult to determine intuitively.

SUMMARY OF THE INVENTION

An object of the present invention is to provide, with due consideration to the drawbacks of such conventional methods, a method and a device for calculating an offset direction of a position of a wire electrode of wire electro-discharge machining apparatus, in which the wire offset direction can be easily input without the knowledge of the advancing direction of the wire electrode.

Another object of the present invention is to provide a method and a device for displaying the wire electrode offset direction, in which it can be intuitively judged whether the wire offset direction is the direction in which the configuration of the product to be produced is contracting, or the direction in which the configuration thereof is expanding.

Further object of the present invention is to provide a method and a device for calculating a inclination direction of the wire electrode for machining a taper section in a workpiece.

Still furhter object of the present invention is to provide a method and a device for displaying the wire electrode inclination direction for machining a taper section in a workpiece, in which it can be intuitively judged whether the wire inclination direction is the direction in which the configuration of the product is upward-expanding, or the direction in which the configuration thereof is downward-expanding.

These objects are achieved in the present invention by the provision of a method for calculating wire electrode offset in wire electro-discharge machining apparatus, comprising the steps of: inputting the wire electrode offset direction in term of whether it is on the in side or on the out side of the theoretical position thereof with respect to the closed perimeter of a product to be produced; and calculating the wire electrode offset direction represented in term of whether it is on the right side or on the left side of the theoretical position thereof with a respect to a wire electrode advancing direction.

In addition, the above object is further achieved in the present invention by the provision of a method for calculating a tilt direction of a wire electrode in a wire electro-discharge machining apparatus, electrode being tilted for machining a taper section in a workpiece, comprising the steps of: inputting the wire electrode tilt direction in term of whether the electrode is tilted in such a direction that a product to be produced has an upward-expanding configuration, or in such a direction that the product to be produced has an downward-expanding configuration; and calculating the wire electrode offset direction represented in term of whether the electrode is tilted to the right or the left with respecting the electrode advancing direction.

BRIEF DESCRIPTION OF THE DRAWINGS

These and other objects, features, and advantages of the present invention will become more apparent from the following description of the preferred embodiments taken in conjunction with the accompanying drawings, in which.

DETAILED DESCRIPTION OF THE PREFERRED EMBODIMENTS

Figure 1:
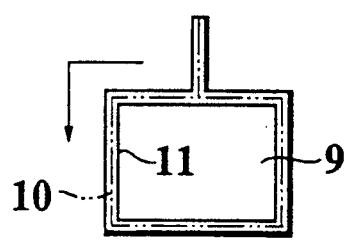
FIGS. 1(A) to (D) are diagrams showing examples of the conventional method for inputting the wire electrode offset direction.
Figure 1:
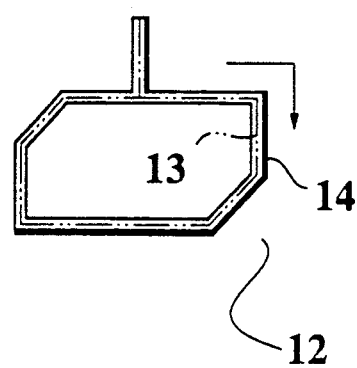
Figure 1:
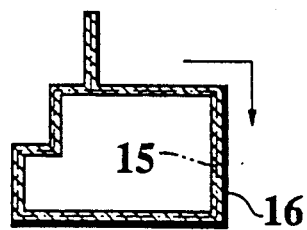
Figure 1:
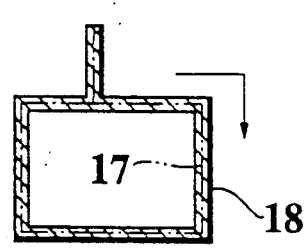
Figure 2:
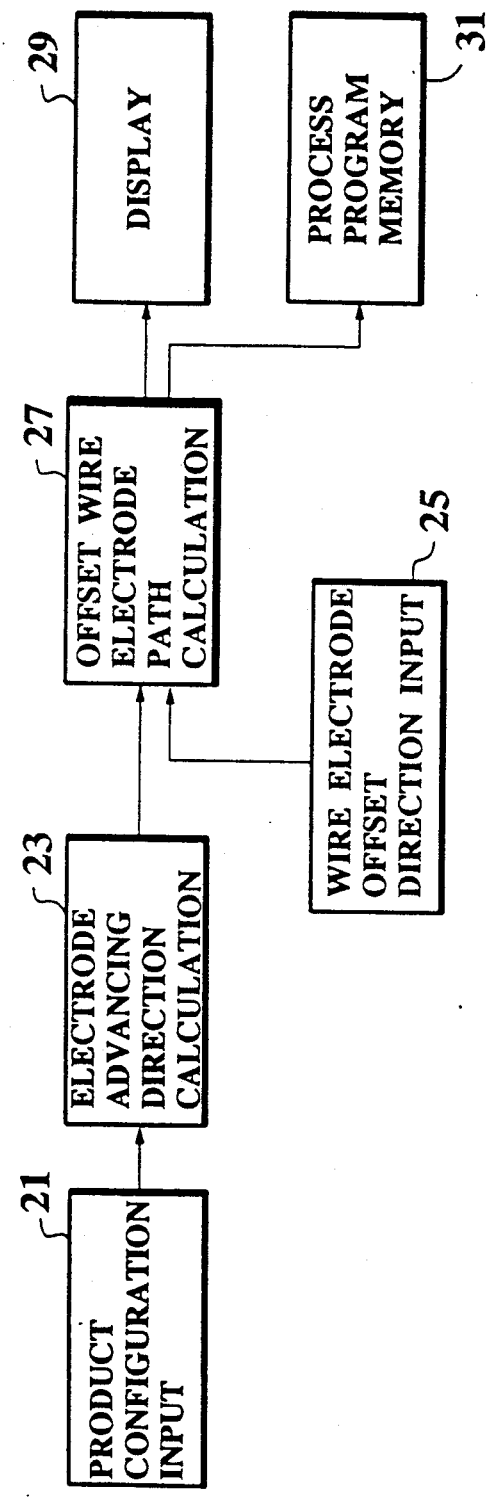
FIG. 2 is a block diagram showing an embodiment of the device in accordance with the present invention.

Now referring to FIG. 2, this figure is a block diagram showing an embodiment of the device for calculating the wire electrode offset direction in the wire electro-discharge machining apparatus.

In FIG. 2, data for the positions of the segments of the perimeter of a product to be produced are input into a product configuration input unit 21 in order of geometrical arrangement of the segments on the perimeter; the electrode will trace the segments of the perimeter in that order during the course of machining operation. The data are input into the unit 21 by means of a numerical control (NC) tape or the like.

The product configuration input into the product configuration input unit 21 are transferred to an electrode advancing direction calculation unit 23, to calculate the electrode advancing direction during the course of machining operation. The advancing direction can be calculated in accordance with the order of input of data for the perimeter segments.

A wire electrode offset direction is input into a wire electrode offset input unit 25. Here, the wire electrode offset direction is instructed as being on the inside or on the outside of a theoretical path of the wire electrode.

When the wire electrode offset direction is input into the wire electrode offset direction input 25, the electrode advancing direction as well as the configuration of the product, and the wire electrode offset direction are transferred to a offset wire electrode offset path calculation unit 27 to calculate a wire electrode path.

Figure 3:
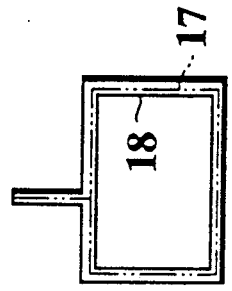
FIGS. 3(A) to (D) are diagrams showing examples of the display of the wire electrode offset direction in the device shown in FIG. 2.
Figure 3:
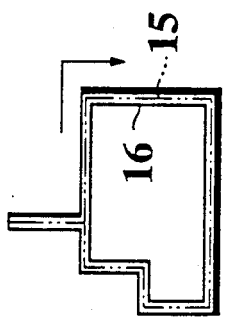
Figure 3:
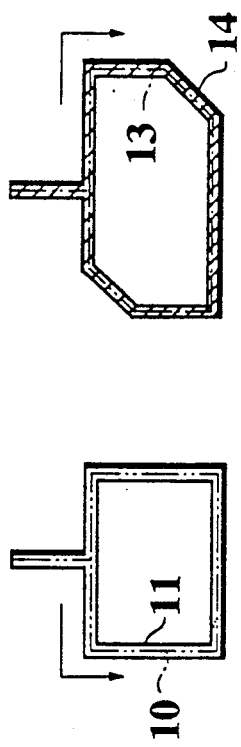

Specifically, as shown in FIG. 3(A), when the wire electrode advances during the course of the machining operation along the path 11 in the counter clockwise direction, and the actual path of the electrode 11 is located at a position shifted on the outside of the theoretical path 11, then a calculation is made in accordance with the above data to prepare the instruction that the offset direction is on the right of the theoretical path 11.

Then, an additional instruction is prepared for displaying the path 11 of the wire electrode as green; the green path is displayed in a display device 29 to distinguish that the offset direction is on the outside of the theoretical path.

As shown in FIG. 3(B), when the wire electrode advance during the course of the machining along the path 14 in the clockwise direction, and the actual wire electrode path is located at a position shifted on the inside of the theoretical path 14, a calculation is made to prepare the instruction that the offset direction is on the right of the theoretical path 14 thereof. In this case, an additional instruction is prepared for displaying the electrode path as yellow, which path is displayed in the display device 29 to distinguish that the offset direction is on the inside of the theoretical path thereof.

As shown in FIGS. 3(C) and 3(D), when the wire electrode advances during the course of the machining along the paths 16, 18 in the clockwise direction, and the path of the electrode is located at a position shifted on the outsides of the theoretical paths 16, 18, a calculation is made to prepare the instruction for shifting the path of electrode on the left of the theoretical paths 16, 18 thereof. An additional instruction is also prepared for displaying the path of the electrode as green in the display device.

The rule of the calculation of whether the actual path of the electrode should be shifted on the right or the left of the theoretical path thereof in accordance with the data of the wire electrode advancing direction and the data of the electrode offset direction in term of "on the outside of the theoretical path" or the "on the inside thereof" is summarized as follows:

|  | on the outside | on the inside |
| --- | --- | --- |
| counter clockwise direction | on the right | on the left |
| clockwise direction | on the left | on the right |

When the calculations are completed in the offset wire electrode path calculation unit 27, the path of the wire electrode is sent to display device 29 and displayed as green or yellow.

The examples of the paths displayed on the display device 29 are shown in FIGS. 3(A) to 3(D). The paths of the wire electrode 11, 16, 18 in FIGS. 3(A), 3(C), and 3(D) are displayed as green, and the path of the wire electrode 14 in FIG. 3(B) as yellow. Hence, it is easily found whether the offset direction of the electrode path is on the outside or the inside of the theoretical path thereof.

In this embodiment, the advancing direction of the wire electrode during the course of machining operation is calculated in the wire electrode advancing direction calculation unit 23. However, it is also acceptable for the advancing direction to be calculated in the offset path calculation unit 27.

The offset path data calculated in the offset path calculation unit 27 are also sent to a process program memory 31, whereby the wire electrode is moved along the offset electrode path with respect to the workpiece.

In this manner, by inputting into the input unit 21 whether the wire offset direction is on the inside or on the outside of the theoretical path of the wire electrode, the wire electrode will be moved along the offset path with respect to the workpiece.

In addition, since the electrode path is displayed in the display unit 29 as green or yellow in accordance with whether the offset direction is on the outside or the inside of the theoretical path, the direction of the offset can be easily distinguished. In other words, it can be intuitively recognized whether this is a direction in which the configuration of the product is contracting, or a direction in which the configuration is expanding, by looking at the pictures on the display device 29.

In the same way as for calculation of the wire electrode offset direction, it is also possible to calculate the electrode inclination direction for machining a taper section in a workpiece. This can be done by inputting into the input unit 25 whether the electrode is tilted in such a direction that a product to be produced has an upward-expanding configuration, or in such a direction that it will have an downward-expanding configuration. Then, in the calculation unit 27, it is calculated whether the electrode will be tilted on the right or the left with respect to the advancing direction thereof in accordance with the above information, which is sent to the calculation unit 27 from the input unit 25 and the electrode advancing direction calculation unit 23.

The present invention is by no means limited to the embodiment which has been described. Other modes can be implemented by making appropriate changes. For example, in the present embodiment, the wire electrode offset direction and the electrode inclination direction, such as inside or outside and upward-expanding or downward-expanding, were displayed as colors, as explained above, but display by symbols or words is also possible.

As can be readily understood from the foregoing explanation, in a wire electro-discharge machining apparatus, the wire electrode offset direction can be input as either inside offset or outside offset, rather than right offset or left offset with respect the electrode advancing direction. And by displaying the wire electrode offset direction by use of color in accordance with whether it is inside offset or outside offset, it can be intuitively understood whether the offset direction is in the direction in which the configuration is contracting, or in the direction in which the configuration is expanding.

What is claimed is:

1. A method for calculating an offset direction of a wire electrode of wire electro-discharge machining apparatus, comprising the steps of:

inputting offset information in terms of whether the wire electrode should be offset on the inner side or on the outer side of the theoretical position thereof with respect to the closed perimeter of a product to be produced; and calculating, on the basis of said offset information and an advancing direction of the wire electrode, the offset direction of the wire electrode as to whether the wire electrode should be offset on the right side or on the left side of the theoretical position thereof with respect to the advancing direction of the wire electrode.

2. The method of claim 1, further comprising the step of displaying the perimeter of a product to be produced by different colors in accordance with the electrode offset direction.

3. A device for calculating an offset direction of a position of a wire electrode of wire electro-discharge machining apparatus, comprising:

means for inputting offset information in terms of whether the wire electrode should be offset on the inner side or on the outer side of the theoretical position thereof with respect to the closed perimeter of a product to be produced; and means for calculating, on the basis of said offset information and an advancing direction of the wire electrode, the offset direction of the wire electrode as to whether the wire electrode should be offset on the right side or the left side of the theoretical position thereof with respect to the advancing direction of the wire electrode.

4. A method for calculating a tilt direction of a wire electrode of a wire electro-discharge machining apparatus electrode being tilted for machining a taper section in a workpiece, comprising the steps of:

inputting offset information in terms of whether the wire electrode should be offset tilted in such a direction that a product to be produced has an upward-expanding configuration, or in such a direction that the product has a downward-expanding configuration; and calculating, on the basis of said offset information and an advancing direction of the wire electrode, the offset direction of the wire electrode as to whether the wire electrode should be tilted to the right or the left with respect to the advancing direction of the wire electrode.

* * * * *